US011647529B2

United States Patent
Inakollu et al.

(10) Patent No.: US 11,647,529 B2
(45) Date of Patent: May 9, 2023

(54) METHOD OF HANDLING BANDWIDTH PART SWITCH DURING MULTIPLE SUBSCRIBER IDENTIFICATION MODULE TUNEAWAY

(71) Applicant: QUALCOMM Incorporated, San Diego, CA (US)

(72) Inventors: Roop Sagar Inakollu, Nellore (IN); Syam Pavan Vadapalli, Visakhapatnam (IN); AnkammaRao Ravuvari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 215 days.

(21) Appl. No.: 17/173,131

(22) Filed: Feb. 10, 2021

(65) Prior Publication Data

US 2022/0256565 A1 Aug. 11, 2022

(51) Int. Cl.
*H04W 8/20* (2009.01)
*H04W 72/50* (2023.01)
(Continued)

(52) U.S. Cl.
CPC .......... *H04W 72/535* (2023.01); *H04W 8/20* (2013.01); *H04W 72/0453* (2013.01); *H04W 72/23* (2023.01); *H04W 72/54* (2023.01)

(58) Field of Classification Search
CPC . H04W 36/08; H04W 36/0058; H04W 36/32; H04W 36/00837; H04W 68/005; H04W 48/20; H04W 4/90; H04W 76/50; H04W 4/021; H04W 72/23; H04W 76/14; H04W 80/02

(Continued)

(56) References Cited

U.S. PATENT DOCUMENTS

2019/0297636 A1\* 9/2019 Gupta ................... H04W 72/23
2021/0051631 A1\* 2/2021 Deogun ............... H04L 5/0098
(Continued)

FOREIGN PATENT DOCUMENTS

WO WO-2019059729 A1 3/2019
WO WO-2020112545 A1 6/2020

OTHER PUBLICATIONS

International Search Report and Written Opinion—PCT/US2022/012549—ISA/EPO—dated May 2, 2022.
(Continued)

*Primary Examiner* — David Q Nguyen
(74) *Attorney, Agent, or Firm* — Loza & Loza LLP

(57) ABSTRACT

Aspects relate to a method of wireless communication at a user equipment (UE). The method includes receiving a set of one or more transmissions in an assigned bandwidth part (BWP) of a set of bandwidth parts (BWPs) from a base station (BS), wherein the set of one or more transmissions includes data addressed to the UE; after missing a reception of a second set of one or more transmissions from the BS following the set, receiving a third set of one or more transmissions in the assigned BWP from the BS, wherein the third set does not include data addressed to the UE; and determining whether a fourth set of one or more transmissions from the BS in one or more unassigned BWPs of the set of BWPs includes data addressed to the UE in response to the third set not including data addressed to the UE.

28 Claims, 11 Drawing Sheets

(51) Int. Cl.
*H04W 72/0453* (2023.01)
*H04W 72/23* (2023.01)
*H04W 72/54* (2023.01)

(58) Field of Classification Search
USPC .......................................... 370/328, 329, 330
See application file for complete search history.

(56) References Cited

U.S. PATENT DOCUMENTS

| | | | |
|---|---|---|---|
| 2021/0075579 A1* | 3/2021 | Liu | H04L 5/0055 |
| 2022/0078822 A1* | 3/2022 | Myung | H04W 72/1289 |
| 2022/0132509 A1* | 4/2022 | Huss | H04L 5/001 |

OTHER PUBLICATIONS

Oppo, et al., "Prevent BWP Switching for PDSCH/PUSCH Transmission", 3GPP Draft, 3GPP TSG-RAN2 #1 01, R2-1801761—Prevent BWP Switching for POSCH or PUSCH Transmission, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 26, 2018-Mar. 2, 2018, Feb. 13, 2018 (Feb. 13, 2018), XP051398954, 4 pages, Retrieved from the Internet: URL: http://www.3gpp.org/ftp/tsg%5Fran/WG2%5FRL2/TSGR2%5F101/Docs/ [retrieved on Feb. 13, 2018] the whole document.

* cited by examiner

METHOD OF HANDLING BANDWIDTH PART SWITCH DURING MULTIPLE SUBSCRIBER IDENTIFICATION MODULE TUNEAWAY

TECHNICAL FIELD

The technology discussed below relates generally to wireless communication networks, and more particularly, to an apparatus, method, and computer-readable medium for handling bandwidth part (BWP) switch during multiple subscriber identification (MSIM) tuneaway or interval when a BWP switch transmitted by a base station (BS) is not received.

INTRODUCTION

A base station, in a wireless communication system, may assign a first bandwidth (also referred to as a bandwidth part (BWP)) among a set of BWPs to a user equipment (UE) to communicate data between these devices. After assigning that particular BWP to the UE, the base station may reassign a second BWP to the UE for various reasons. For example, the number of UEs assigned to the first BWP may be relatively large, so as to more balance the load on each BWP, the base station may reassign the second BWP to the UE. IF the UE misses the BWP reassignment (often referred to as a BWP switch), the UE may continue to monitor the first BWP, which the base station does not use to send data to the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

An aspect of the disclosure relates to a method of wireless communication at a user equipment (UE) is disclosed. The method includes receiving a first set of one or more transmissions in an assigned bandwidth part (BWP) of a set of bandwidth parts (BWPs) from a first base station (BS), wherein the first set of one or more transmissions includes data addressed to the UE; after missing a reception of a second set of one or more transmissions from the first BS following the first set, receiving a third set of one or more transmissions in the assigned BWP from the first BS, wherein the third set does not include data addressed to the UE; and determining whether a fourth set of one or more transmissions from the first BS in one or more unassigned BWPs of the set of BWPs includes data addressed to the UE in response to the third set not including data addressed to the UE.

Another aspect of the disclosure relates to a user equipment (UE) including a transceiver; a memory; and a processor communicatively coupled to the transceiver and the memory, wherein the processor and the memory are configured to: receive a first set of one or more transmissions in an assigned bandwidth part (BWP) of a set of bandwidth parts (BWPs) from a first base station (BS) via the transceiver, wherein the first set of one or more transmissions includes data addressed to the UE; after missing a reception of a second set of one or more transmissions from the first BS following the first set, receive a third set of one or more transmissions in the assigned BWP from the first BS via the transceiver, wherein the third set of one or more transmissions does not include data addressed to the UE; and determine whether a fourth set of one or more transmissions from the first BS in one or more unassigned BWPs of the set of BWPs includes data addressed to the UE in response to the third set not including data addressed to the UE.

Another aspect of the disclosure relates to a user equipment (UE) including means for receiving a first set of one or more transmissions in an assigned bandwidth part (BWP) of a set of bandwidth parts (BWPs) from a first base station (BS), wherein the first set of one or more transmissions includes data addressed to the UE; means for receiving a third set of one or more transmissions in the assigned BWP from the first BS after missing a reception of a second set of one or more transmissions from the first BS following the first set, wherein the third set of one or more transmissions does not include data addressed to the UE; and means for determining whether a fourth set of one or more transmissions from the first BS in one or more unassigned BWPs of the set of BWPs includes data addressed to the UE in response to the third set not including data addressed to the UE.

Another aspect of the disclosure relates to a non-transitory computer-readable medium storing computer-executable code, comprising code for causing a computer in a user equipment (UE) to: receive a first set of one or more transmissions in an assigned bandwidth part (BWP) of a set of bandwidth parts (BWPs) from a first base station (BS) via the transceiver, wherein the first set of one or more transmissions includes data addressed to the UE; after missing a reception of a second set of one or more transmissions from the first BS following the first set, receive a third set of one or more transmissions in the assigned BWP from the first BS via the transceiver, wherein the third set of one or more transmissions does not include data addressed to the UE; and determine whether a fourth set of one or more transmissions from the first BS in one or more unassigned BWPs of the set of BWPs includes data addressed to the UE in response to the third set not including data addressed to the UE.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
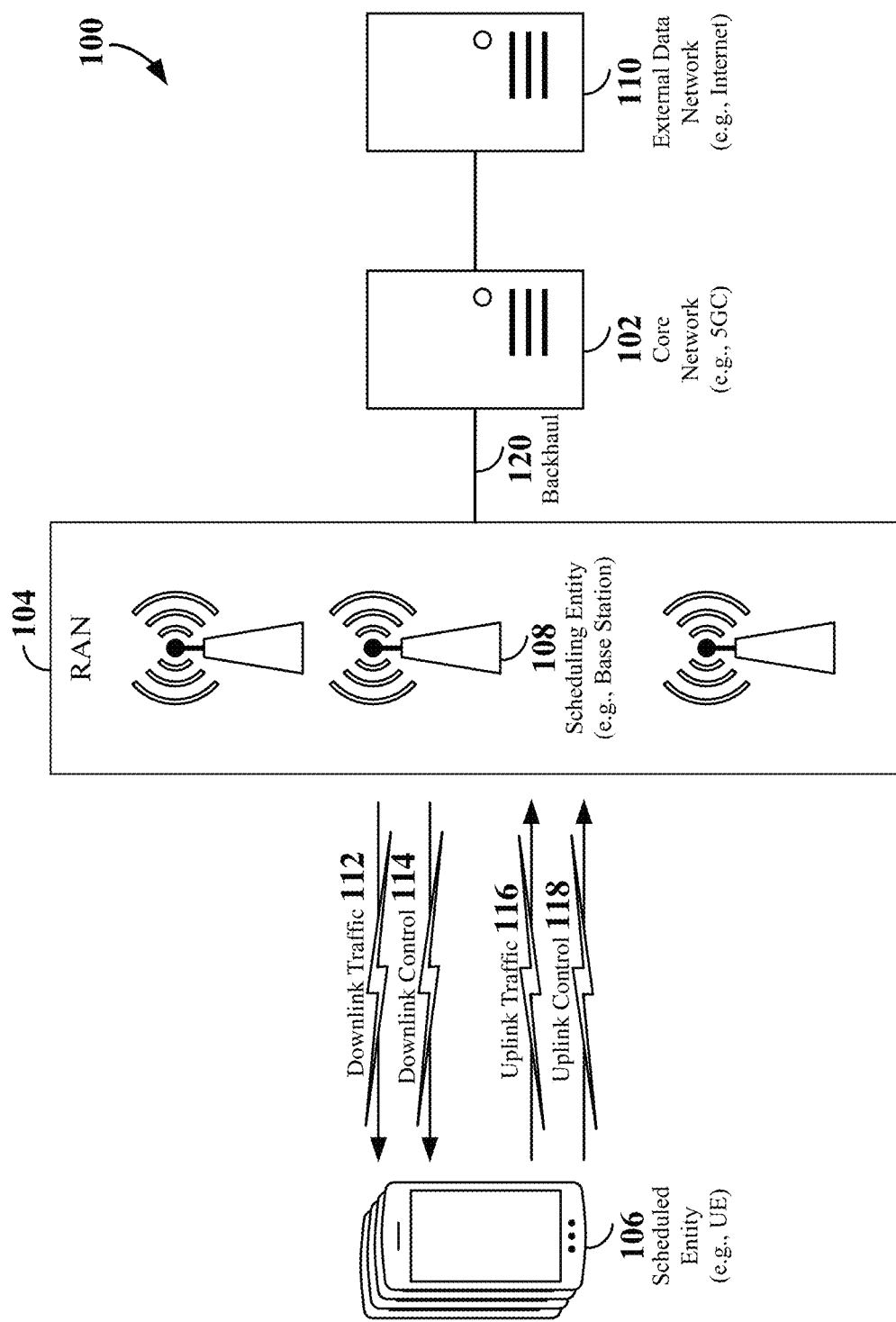
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable radio access technology (RAT) or

RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things". A mobile apparatus may additionally be an automotive or other transportation vehicle, a remote sensor or actuator, a robot or robotics device, a satellite radio, a global positioning system (GPS) device, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
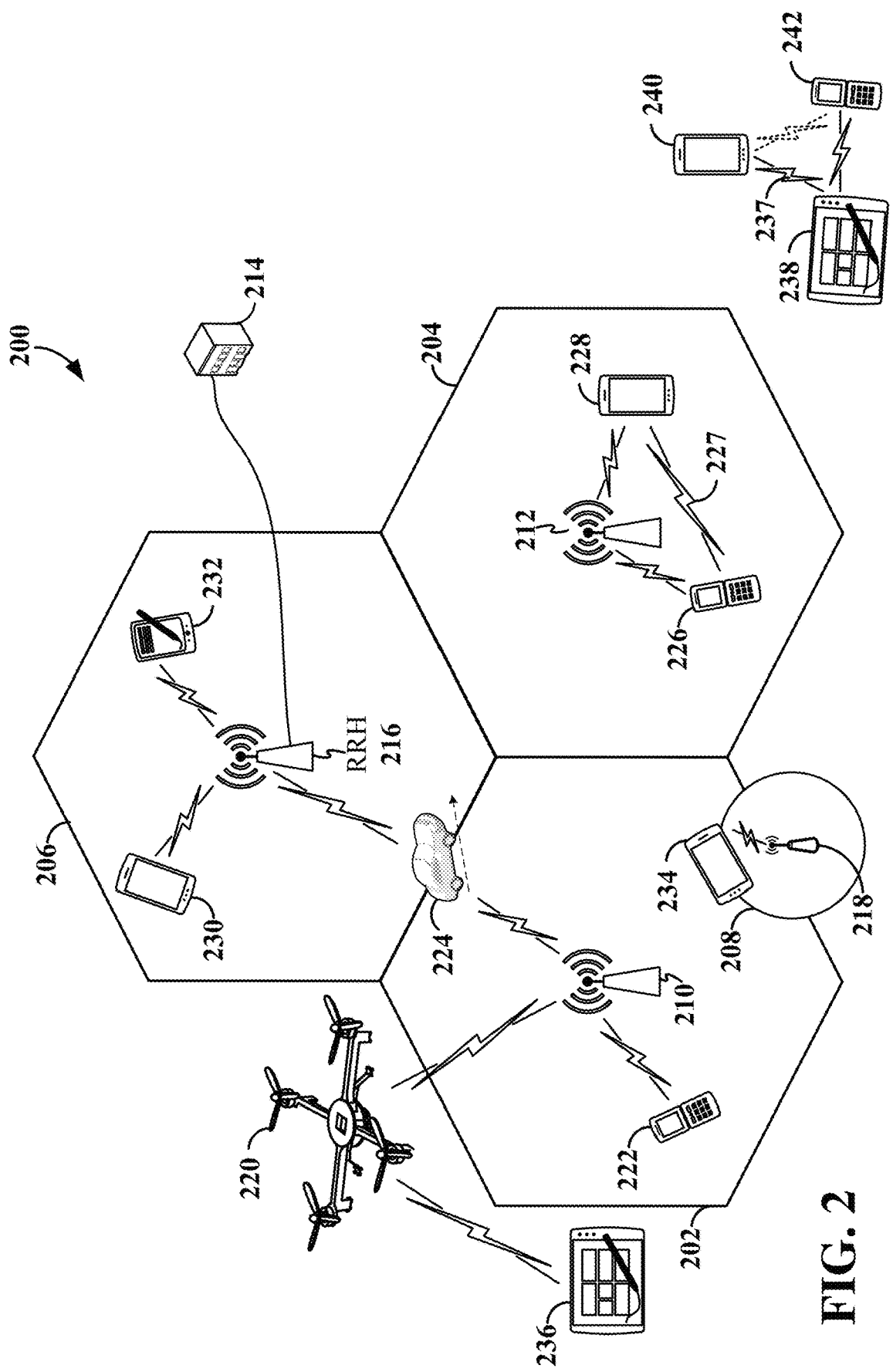
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, where a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

The air interface in the radio access network 200 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at sometimes the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may further utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-1-DMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
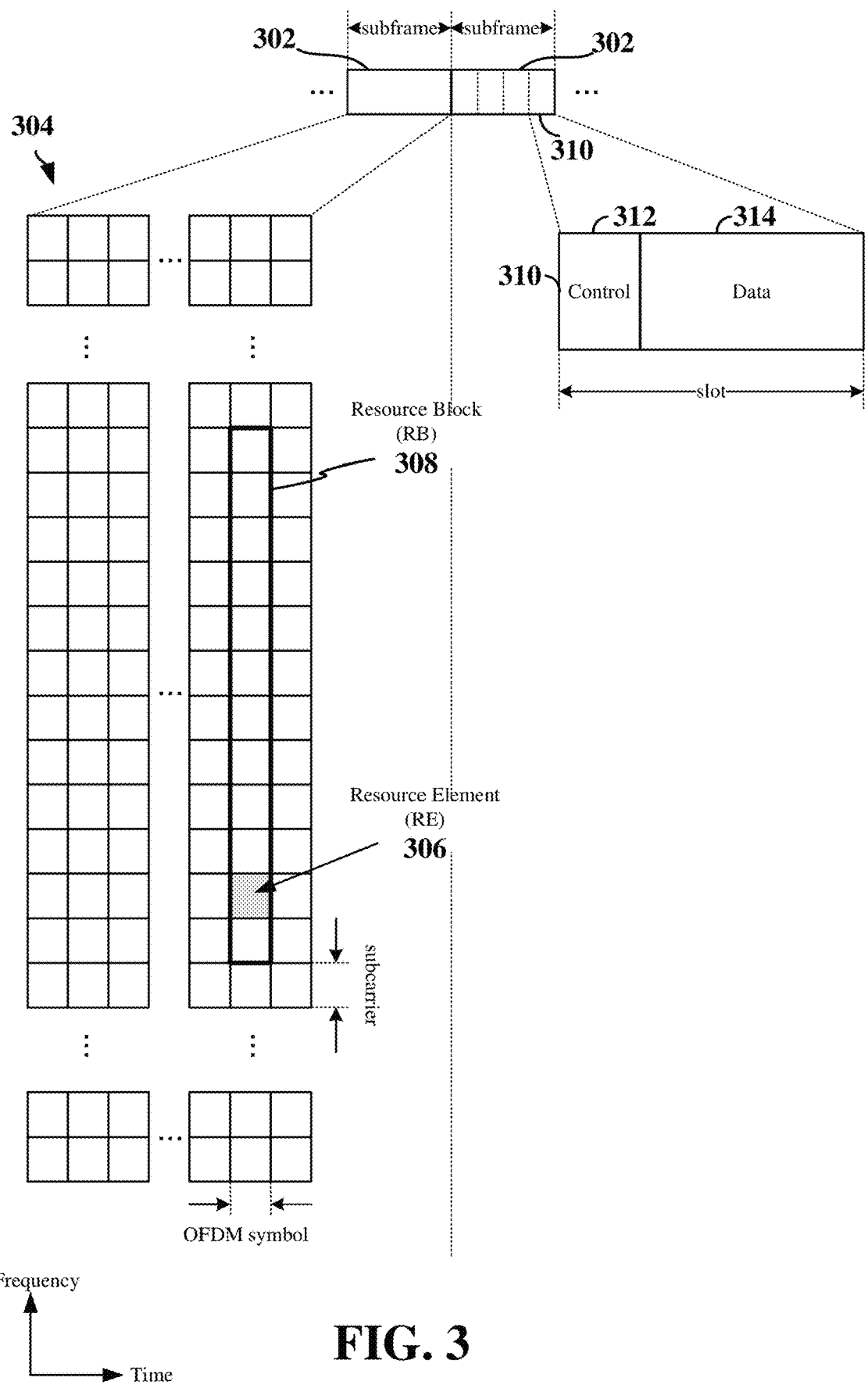
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each one (1) millisecond (ms) subframe 302 may consist of one or multiple adjacent slots. In the example shown in FIG. 4, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices and a groupcast communication is delivered to a group of intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

In order to gain access to a cell, a UE may perform a random access procedure over a physical random access channel (PRACH). The UE may identify a random access search space including PRACH resources for initiating a RACH procedure from the SIB1. For example, a random access process may be commenced after a UE acquires a cell and determines occurrence of a RACH occasion (e.g., PRACH resources) after reading SSB and a SIB1. The SSB provides the initial system information (SI), and the SIB1 (and other SIB blocks) provide the remaining minimum SI (RMSI). For example, the PBCH MIB of the SSB may carry a first part of the SI that a user equipment (UE) needs in order to access a network. The SIBs (e.g., SIB1 and SIB2) can carry the RMSI that a UE needs to gain access to the network.

RACH procedures may be performed in various scenarios, such as loss of uplink synchronization, lack of available PUCCH resources, scheduling request failure, and other use cases. In addition, a RACH procedure may be contention-based or contention-free and may include a 2-step RACH process (contention-based or contention-free), a 3-step RACH process (contention-free), or a 4-step RACH process (contention-based).

Figure 4A:
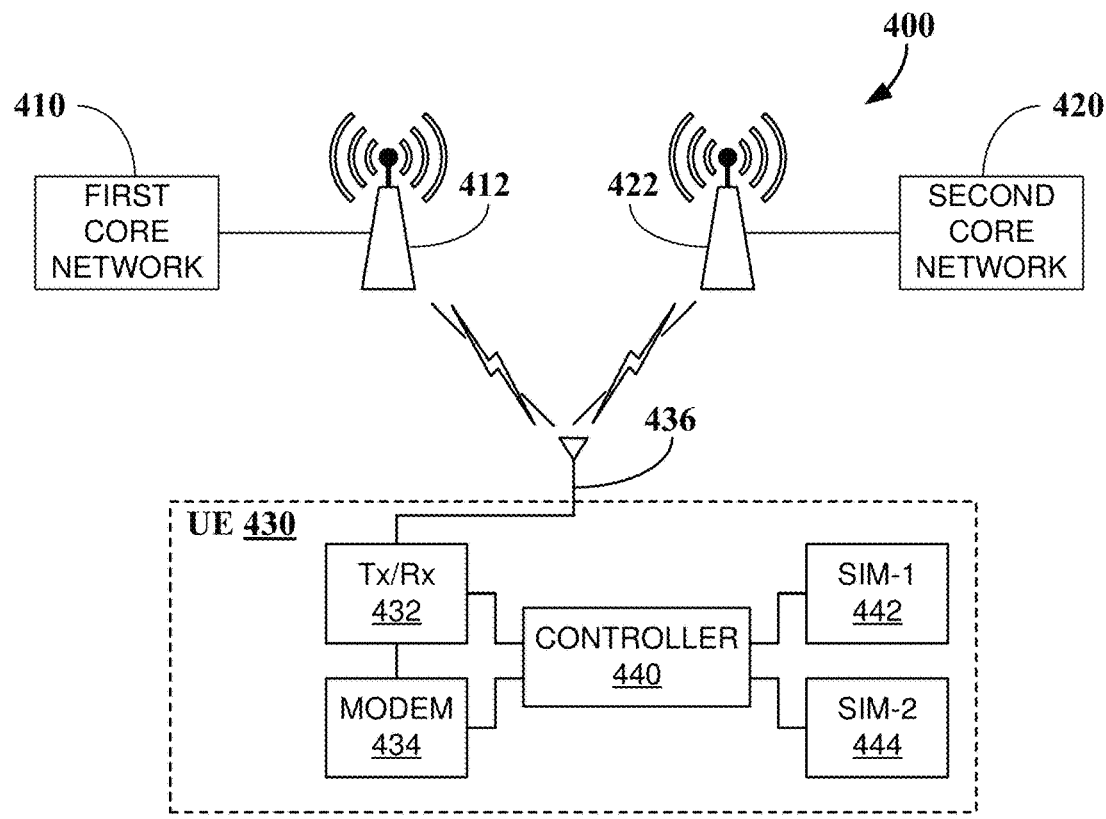
FIGS. 4A-4B are diagrams illustrating example wireless communication systems according to some aspects.

FIG. 4A depicts a block diagram of an example wireless communication system 400 according to some aspects. The wireless communication system 400 includes a first base station (BS) 412 coupled to a first core network 410. The wireless communication system 400 also includes a second base station (BS) 422 coupled to a second core network 420. The wireless communication system 400 further includes a user equipment (UE) 430 wirelessly coupled to the first and second base stations (BSs) 412 and 422, as discussed further herein.

In this example, the UE 430 has multiple subscriber identification modules (MSIM) capabilities; that is, it has multiple SIM cards for communicating with multiple wireless networks via different base stations or radio access technologies (RATs). More specifically, the UE 430 includes at least one antenna 436, a transceiver (Tx/Rx) 432 coupled to the at least one antenna 436, a modulator-demodulator (modem) 434 coupled to the transceiver 432, a controller 440 coupled to the transceiver 432 and the modem 434, a first subscriber identification module (SIM-1) card 442, and a second subscriber identification module (SIM-2) card 444, both coupled to the controller 440. Although, in this example, the UE 430 includes two SIM cards 442 and 444, it shall be understood that the UE 430 may include more than two SIM cards.

In this example, the SIM-1 card 442 provides information to the allow the UE 430 to communicate with the first core network 410 via the base station 412. As an example, the first core network 410 and base station 412 may perform wireless communications under an NR 5G (or other) protocol, and may be operated by a particular wireless communication entity or carrier. Similarly, the SIM-2 card 444 provides information to the allow the UE 430 to communicate with the second core network 420 via the base station 422. As an example, the second core network 420 and base station 422 may perform wireless communications under an NR 5G, LTE, GSM or other protocol, and may be operated by another wireless communication entity or carrier.

There are several advantages for the UE 430 to be configured with multiple SIM cards 442 and 444. For example, one of the SIM cards (e.g., SIM-1 442) may be used by a user for employment or work purposes, while the other SIM card (e.g., SIM-2 444) may be used for personal reasons. Another example would be one of the SIM cards (e.g., SIM-1 442) may be used by a user within his/her home country, while the other SIM card (e.g., SIM-2 444) may be used by the user when travelling abroad. Still another example would be that, for economical purposes, one of the SIM cards (e.g., SIM-1 442) may be used by a user as a data plan, while the other SIM card (e.g., SIM-2 444) may be used as a voice/small messaging service (SMS) plan. It shall be understood that there are other configurations in which the UE 430 may employ multiple SIMs.

The UE 430 may time-multiplex its communications with the two different core networks 410 and 420 via the base stations 412 and 422, respectively. For example, during a first-time interval, the controller 440 may be operating in accordance with the information in the SIM-1 card 442. In this regard, the controller 440 configures the modem 434 and transceiver 432 to wirelessly communicate with the base station 412 via the at least one antenna 436. During the first-time interval, the modem 434 and transceiver 432 may not be configured to wirelessly communicate with the base station 422 (e.g., because it uses a different frequency band than base station 412). During a second-time interval (e.g., not overlapping with the first-time interval), the controller 440 may be operating in accordance with the information in the SIM-2 card 444. In this regard, the controller 440 configures the modem 434 and transceiver 432 to wirelessly communicate with the base station 422 via the at least one antenna 436. During the second time interval, the modem 434 and transceiver 432 may not be configured to wirelessly communicate with the base station 412 (e.g., because it uses a different frequency band than base station 412).

Under certain protocols, such as NR 5G, the UE 430 communicates with the base station 412 via an assigned bandwidth among a set of different bandwidths or bandwidth parts (BWPs). In NR 5G, a BWP is defined as contiguous set of physical resource blocks (PRBs) on a given carrier. The base station 412 may provide a set of available BWPs (e.g., four (4) BWPs) to the UE 430 via a radio resource control (RRC) signal. The UE 430 may use any one of the set of BWPs at a given time to receive downlink data from or transmit uplink data to the base station 412. The BWP used at a given time is the assigned or active BWP. The other BWPs in the set are the unassigned or inactive BWPs.

Each of the BWPs in the set may have a distinct characteristic useful for certain applications. For example, a particular BWP may have a relatively small frequency bandwidth with a relatively small subcarrier spacing (SCS) (e.g., a BW of approximately 180 kiloHertz (kHz) and an SCS of 15 kHz), which may be useful for relatively low power applications, such as receiving system information block (SIB), or receiving or transmitting small amount of data from or to the base station 412. Another BWP may have a relatively large BW and SCS (e.g., a BW of approximately 720 kHz and an SCS of 60 kHz), which may be useful for relatively high power applications, such as receiving or transmitting high-rate data, such as multimedia (e.g., video and/or audio) data from or to the base station 412. Still another BWP may have medium-sized BW and SCS (e.g., a BW of approximately 360 kHz and an SCS of 30 kHz), which may be useful for medium power applications, such as receiving or transmitting internet, web-based, email type data from or to the base station 412.

During an initial random access channel (RACH) procedure between the UE 430 and the base station 412, the base station 412 may assign a default BWP to the UE 430, which, in most cases, will be the BWP with the smallest BW and SCS. Depending on certain conditions, after the initial RACH procedure and assignment of the default BWP, the base station 412 may assign another BWP among the set of BWPs configured for the UE 430. This is sometimes referred to in the relevant art as a BWP switch. A reason for a BWP switch may be that the base station 412 has to transmit high rate data or large amounts of downlink data to the UE 430, and a higher BW and SCS may be more suitable for transmitting the data to the UE 430. Another reason for a BWP switch may be that the base station 412 has determined that there are too many UEs assigned to a particular BWP, and to reduce the load on that particular BWP, the base station 412 assigns another BWP to the UE 430. After the conditions for the BWP switch has resolved (e.g., data transmission to the UE 430 has completed or the load on the previous BWP has lightened), the base station 412 may send another BWP switch to the UE 430 so that it operates in a lower BW and SCS to save power.

A BWP switch is typically effectuated by the base station 412 transmitting a downlink control information (DCI) in a physical downlink control channel (PDCCH) to the UE 430. There are different types of DCIs. For example, a DCI with a format 1_1 or 1_2 according to the NR 5G protocol (often referred to as a "DCI_1_1" or "DCI_1_2") schedules downlink data for the UE 430 in a physical downlink shared channel (PDSCH) in the same slot in which the DCI is transmitted or in a following downlink slot as indicated in the DCI. A DCI with a format 0_1 or 0_2 according to the NR 5G protocol (often referred to as a "DCI_0_1" or "DCI_0_2") schedules uplink data to be transmitted by the UE 430 in a physical uplink shared channel (PUSCH) of a following uplink slot. There are other DCI formats specified by the NR 5G protocol.

In each format, the DCI includes a bandwidth part indicator field identifying the BWP for that particular downlink or uplink data transmission. For example, if the UE 430 is currently assigned to BWP#1, and it receives a DCI with a bandwidth part indicator field identifying BWP#2, a BWP switch has occurred, and the UE 430 responds by designating BWP#2 the newly assigned or reassigned BWP for receiving the downlink data or transmits the uplink data in the scheduled slot and resource blocks.

In the case of the UE 430 having multiple SIM cards (SIM-1 442 and SIM-444), an issue arises when the base station 412 transmits a BWP switch while the UE 430 is communicating with the other base station 422 in accordance with the information in SIM-2 card 444 (this is referred to as a "tuneaway"). On occasion or time-basis, the UE 430 may communicate with (e.g., receive one or more transmissions from) the other base station 422 for different reasons, such as to check for pages regarding various notifications, perform inter radio access technology (IRAT) measurements, collect system information blocks (SIBs), perform cell acquisition or reacquisition, system registration, cell reselection, receive emergency-related notifications, receive public land mobile network (PLMN) information, etc. If the base station 412 transmits a BWP switch while the UE 430 has configured its modem 434 and transceiver 432 for communicating with the other base station 422, the UE 430 will miss the BWP switch. Thus, when the UE 430 subsequently reconfigures its modem 434 and transceiver 432 to communicate with base station 412, its assigned BWP does not match the new BWP identified in the BWP switch. Thus, the UE 430 will not receive DCIs (data) on the assigned BWP. Accordingly, techniques are described herein that a UE may implement to deal with missing a BWP switch.

Figure 4B:
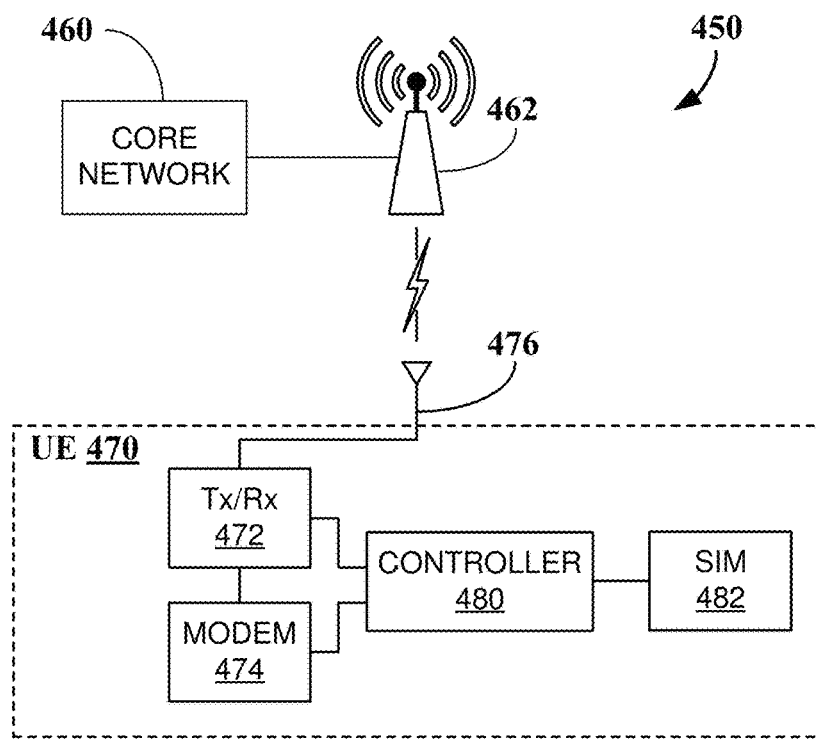

FIG. 4B depicts a block diagram of another example wireless communication system 450 according to some aspects. The scenario previously discussed regarding a UE missing a reception of a BWP switch from a base station may arise due to other factors. Accordingly, the wireless communication system 450 is described with reference to another factor (e.g., adverse channel condition) where a UE misses a BWP switch.

In particular, the wireless communication system 450 includes a base station (BS) 462 coupled to a core network 460. The wireless communication system 450 further includes a user equipment (UE) 470 wirelessly coupled to the base station 462. The UE 470 includes at least one antenna 476, a transceiver (Tx/Rx) 472 coupled to the at least one antenna 476, a modulator-demodulator (modem) 474 coupled to the transceiver 472, a controller 480 coupled to the transceiver 472 and modem 474, and a subscriber identification module (SIM) card 482 coupled to the controller 480. The controller 480 configures the transceiver 472 and modem 474 to communicate with the base station 462 in accordance with information in the SIM card 482.

Considering again the scenario where the base station 462 transmits a BWP switch to the UE 470. However, during such transmission, the condition of the channel between the UE 470 and the base station 462 is adverse (e.g., it has considerable noise, interference, fading, etc.) that the UE 470 misses the BWP switch. In such case, when the channel condition improves and the UE 470 is able to receive the transmission from the base station 462, its assigned BWP does not match the new BWP identified in the BWP switch. Thus, the UE 470 will not receive DCIs (data) on the assigned BWP. Again, techniques are described herein that the UE 470 may implement in dealing with such scenario. It shall be understood that the scenario regarding missing a BWP switch due to adverse channel condition is also applicable to MSIM-capable UEs.

Figure 5:
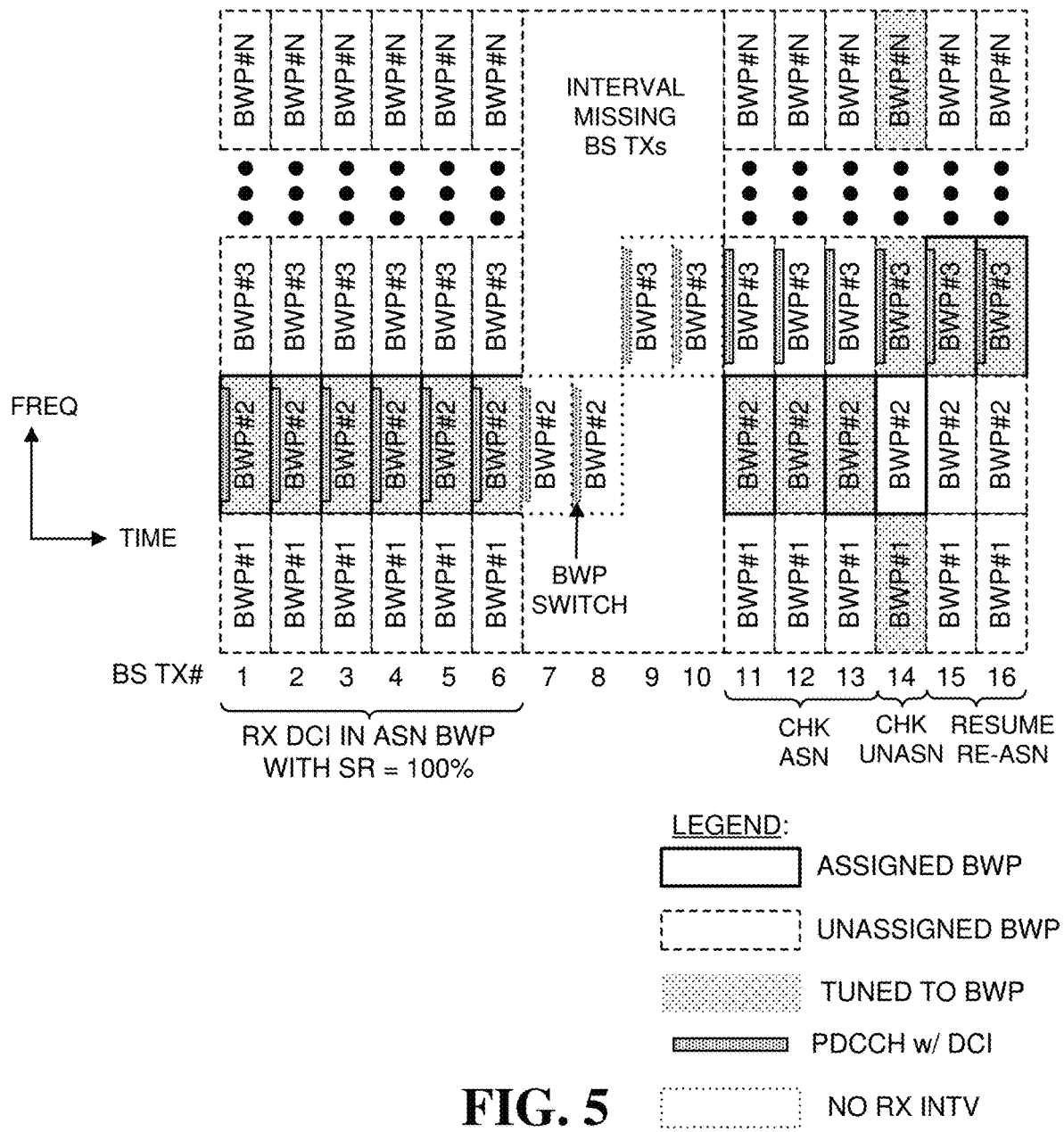
FIGS. 5-9 are diagrams illustrating various example methods of receiving and processing a set of base station (BS) transmissions by a user equipment (UE) according to some aspects.

FIG. 5 illustrates a time-frequency graph related to an example method of receiving and processing a set of transmissions from a base station (412 or 462) by a user equipment (UE) (430 or 470) according to some aspects. The x- or horizontal-axis of the graph represents time. The y- or vertical axis of the graph represents frequency. Each column of the graph represents a separate transmission by the base station (412 or 462), wherein each transmission may be a slot, subframe, frame, or other organized time-based, time-division or time-separated transmission. In this example, there are 16 separate transmissions in the time domain, labeled 1-16. In each column, there may be a set of N transmissions in a set of N bandwidth parts (BWPs) #1 to #N. The base station (412 or 462) may have provided the set of N BWPs to the UE in an RRC message (e.g., N=4).

As indicated in the legend of FIG. 5, the solid-line rectangle represents the assigned BWP that the UE (430 or 470) is currently using to communicate with the base station (412 or 462). It is the assigned BWP from the perspective of the UE (430 or 470), i.e., the UE designated assigned BWP. The dashed-line rectangle represents the unassigned BWPs that is available for the UE (430 or 470) to communicate with the base station (412 or 462) if subsequently assigned by the base station. The lightly-shaded rectangle represents the BWP that the UE (430 or 470) is tuned to for receiving the corresponding transmission from the base station (412 or 462). Note that the tuned to BWP may coincide with the assigned BWP as indicated by a solid-line rectangle being lightly-shaded. Similarly, the tuned to BWP may coincide with an unassigned BWP as indicated by a dashed-line rectangle being lightly-shaded. The darkly-shaded smaller rectangle represents the PDCCH with a DCI (data) addressed to the UE (430 or 470). And, the dotted-rectangle represents a base station transmission that is not received by the UE (430 or 470), as in the case, the UE may be tuned to the other base station 422 per the second SIM-2 card 444 ("a tuneaway") or the condition of the channel between the UE (430 or 470) and the base station (412 or 462) is adverse to such a degree that the UE does not receive and/or successfully decode the transmission from the base station.

As the graph illustrates, with regard to base station transmissions 1-6, the UE (430 or 470) is assigned to BWP#2 as indicated by the solid-line rectangles; the UE (430 or 470) is tuned to BWP#2 as indicated by the lightly shading of the rectangles; and the UE (430 or 470) is receiving DCIs (data) addressed to the UE in the PDDCH of the transmissions as indicated by the darkly-shaded small rectangle. The PDDCH may have other DCIs (data) addressed to other UEs, but those will have a different identifier pointing to the other UEs. For example, in NR 5G and LTE, each DCI has a cyclic redundancy check (CRC) that is masked (exclusive-ORed) with a cell-radio network temporary identifier (C-RNTI) that pertains to a UE. To determine whether a DCI is addressed to the UE, the UE first unmasks the CRC of the DCI with its C-RNTI, and then checks the integrity of the DCI with the unmasked CRC to determine if the DCI correlates with the CRC. If it correlates, the DCI is addressed to the UE. If it does not correlate, the DCI is not addressed to the UE or may contain error(s).

Further, according to the example in FIG. 5, after base station transmission 6, the UE (430 or 470) does not receive transmissions 7-10 from base station (412 or 462) for different reasons as discussed (e.g., during a tuneaway interval or an interval of adverse channel condition). As indicated, the UE (430 or 470) misses two transmissions in the assigned BWP#2 each including a PDDCH with a DCI addressed to the UE. More specifically, the DCI in the PDDCH of base station transmission 8 in the assigned BWP#2 includes a bandwidth part indicator field identifying BWP#3, which is different than the assigned BWP designated by the UE (430 or 470) (i.e., a BWP switch). However, as the UE (430 or 470) did not receive such transmission, the UE is unaware that a BWP switch has occurred. Additionally, following the BWP switch, in base station transmissions 9-10 in BWP#3, the base station includes PDDCH that has DCI (data) addressed to the UE.

Further, in accordance with the example, the UE (430 or 470) then receives base station transmissions 11-16 for various other reasons, such as the UE completing the tuneaway task (e.g., check for a page, etc.) in accordance with the information in second SIM-2 card 444, and has reconfigured its modem and transceiver to receive the transmissions from the base station (412 or 462) in accordance with the information in first SIM-1 card 442, or the channel between the UE and the base station (412 or 462) has improved such that the UE is able to receive the base station transmissions.

Note that because of the BWP switch, there is no PDDCH with a DCI (data) addressed to the UE (430 or 470) in the assigned BWP#2 in base station transmissions 11-13. That is, because of the BWP switch, the base station (412 or 462) is transmitting DCI (data) addressed to the UE in the PDDCH of BWP#3, which the UE (430 or 470) does not receive because it is still tuned to BWP#2. If the UE (430 or 470) continues to monitor BWP#2, it will not receive any new DCIs, and eventually the UE may have to perform a radio link control (RLC) reset as a result of a radio link failure, and may have to perform an additional RACH procedure with the base station (412 or 462) to reestablish the appropriate assigned BWP for communicating with the base station. This RLC reset/failure and RACH procedure may result in significant delays, which may be undesirable.

So, to address this issue, in response to the UE (430 or 470) determining that there is no DCI (data) in the assigned BWP of a certain number of one or more transmissions from the base station (412 or 462) following the interval where it misses one or more base station transmissions, the UE goes and checks the one or more unassigned BWPs to determine whether there is a DCI (data) addressed to the UE in one of the unassigned BWPs. For instance, in the example of FIG. 5, after the UE (430 or 470) does not receive any DCI (data) in base station transmissions 11-13 in the assigned BWP#2, the UE tunes to one or more of the unassigned BWPs #1, 3-N during base station transmission 14 to determine whether there is a DCI (data) addressed to the UE. In this example, the UE (430 or 470) determines that there is a DCI (data) addressed to it in the PDDCH of BWP#3. Accordingly, the UE (430 or 470) has determined that a BWP switch has occurred. The UE (430 or 470) then designates the assigned or reassigned BWP as BWP#3, and continues to receive DCIs (data) in BWP#3 in one or more transmissions 15-16 from the base station (412 or 462).

Figure 6:
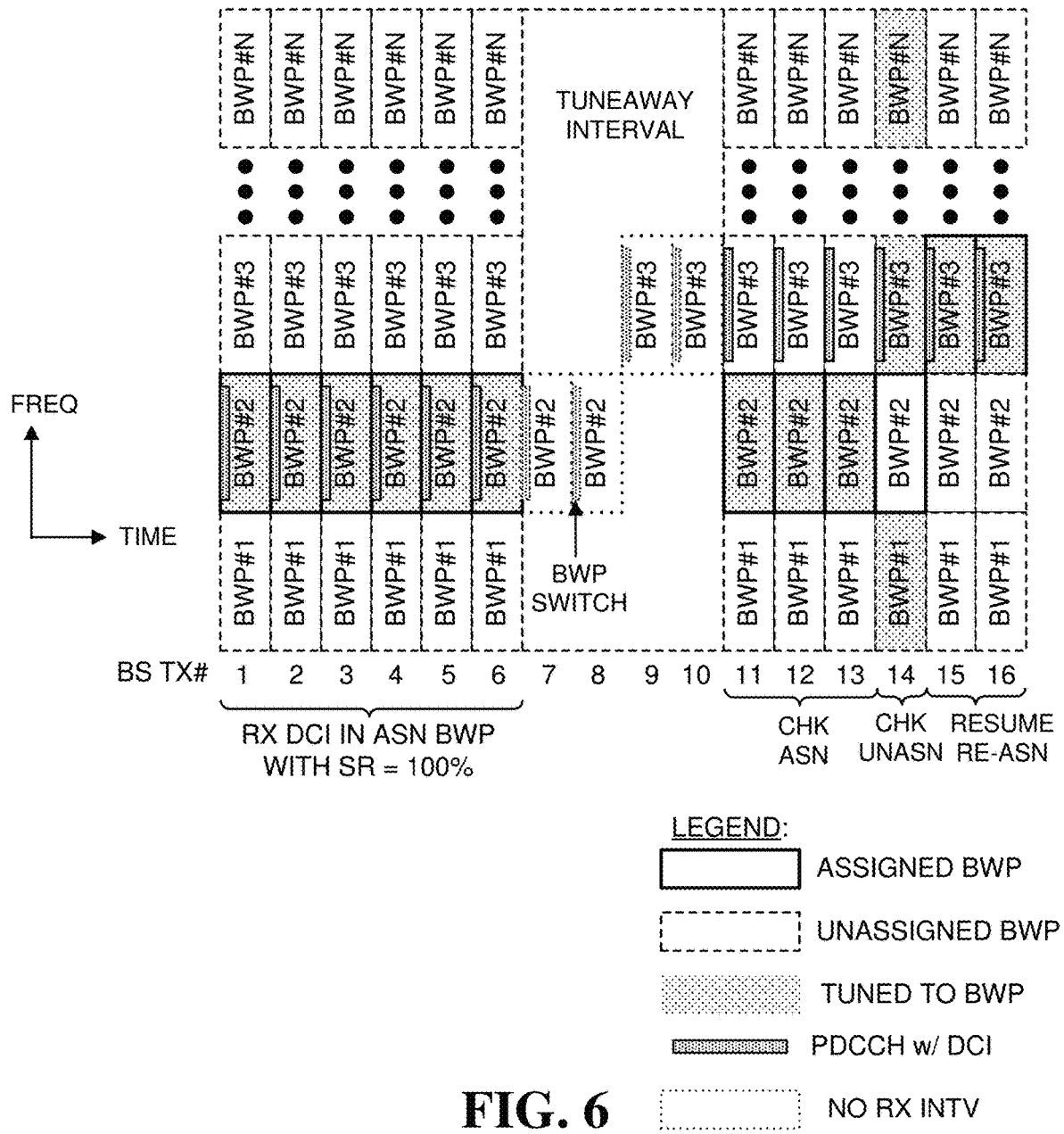

FIG. 6 illustrates a time-frequency graph related to another example method of receiving and processing a set of transmissions from a base station (412 or 462) by a user equipment (UE) (430 or 470) according to some aspects. The example of FIG. 6 is similar to that of FIG. 5, with the specific reason for not receiving transmissions 7-10 from the base station (412 or 462) being that the UE (430 or 470) is tuned to the other base station 422 (a tuneaway) in accordance with the information in the second SIM-2 card 444. As discussed, once the UE (430 or 470) has completed the task associated with the tuneaway, the UE reconfigures its modem and transceiver to receive the transmissions from the base station (412 or 462) in accordance with the information in the first SIM-1 card 442.

Figure 7:
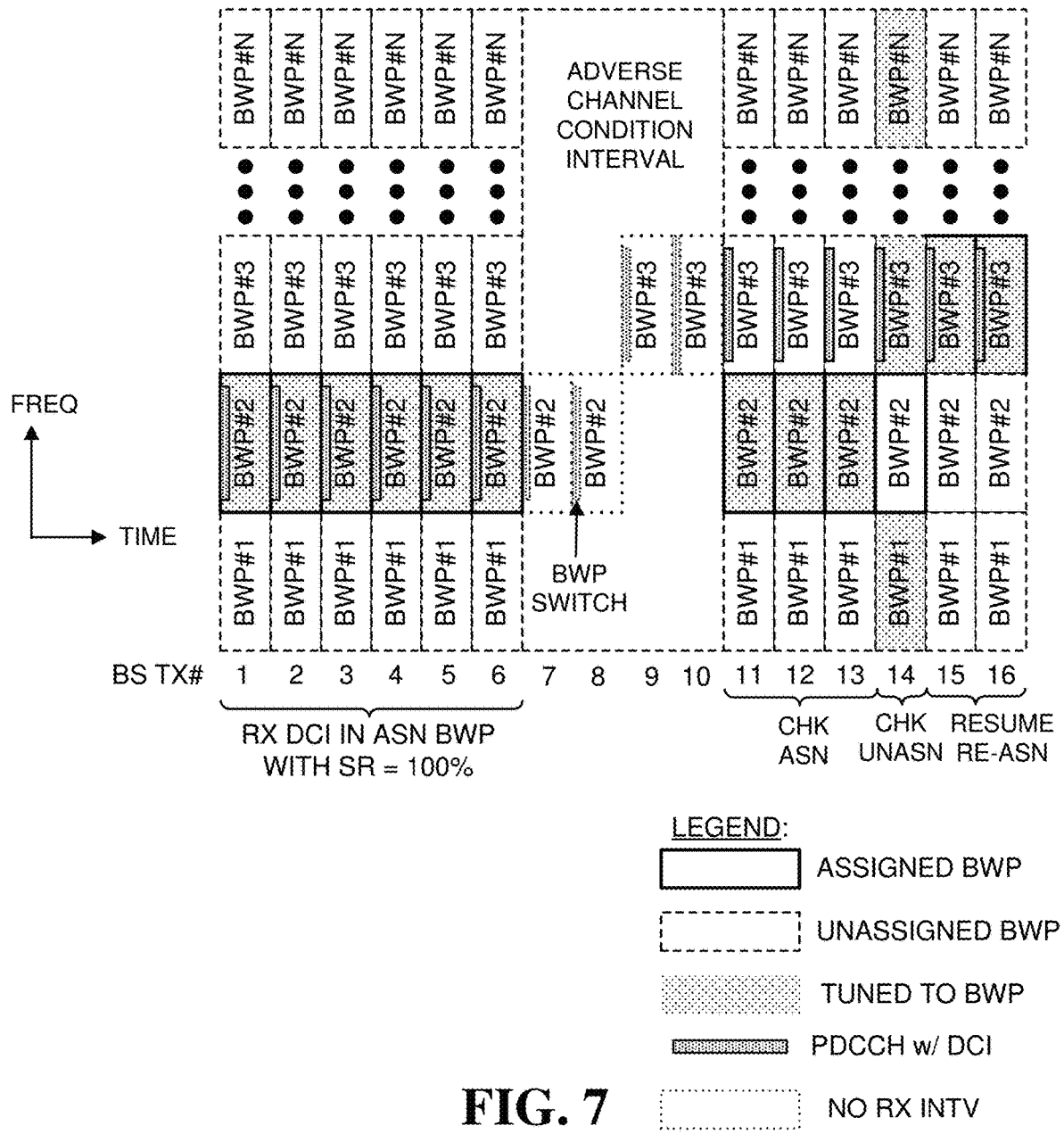

FIG. 7 illustrates a time-frequency graph related to another example method of receiving and processing a set of transmissions from a base station (412 or 462) by a user equipment (UE) (430 or 470) according to some aspects. The example of FIG. 7 is similar to that of FIG. 5, with the specific reason for not receiving transmissions 7-10 from the base station (412 or 462) being due to an adverse channel condition between the UE (430 or 470) and the base station. For example, the adverse channel condition could be due to increased noise, channel fading, interference, or other adverse channel related conditions. Once the channel condition has improved, the UE (430 or 470) is able to receive the base station transmissions 11-16 as illustrated in FIG. 7.

Figure 8:
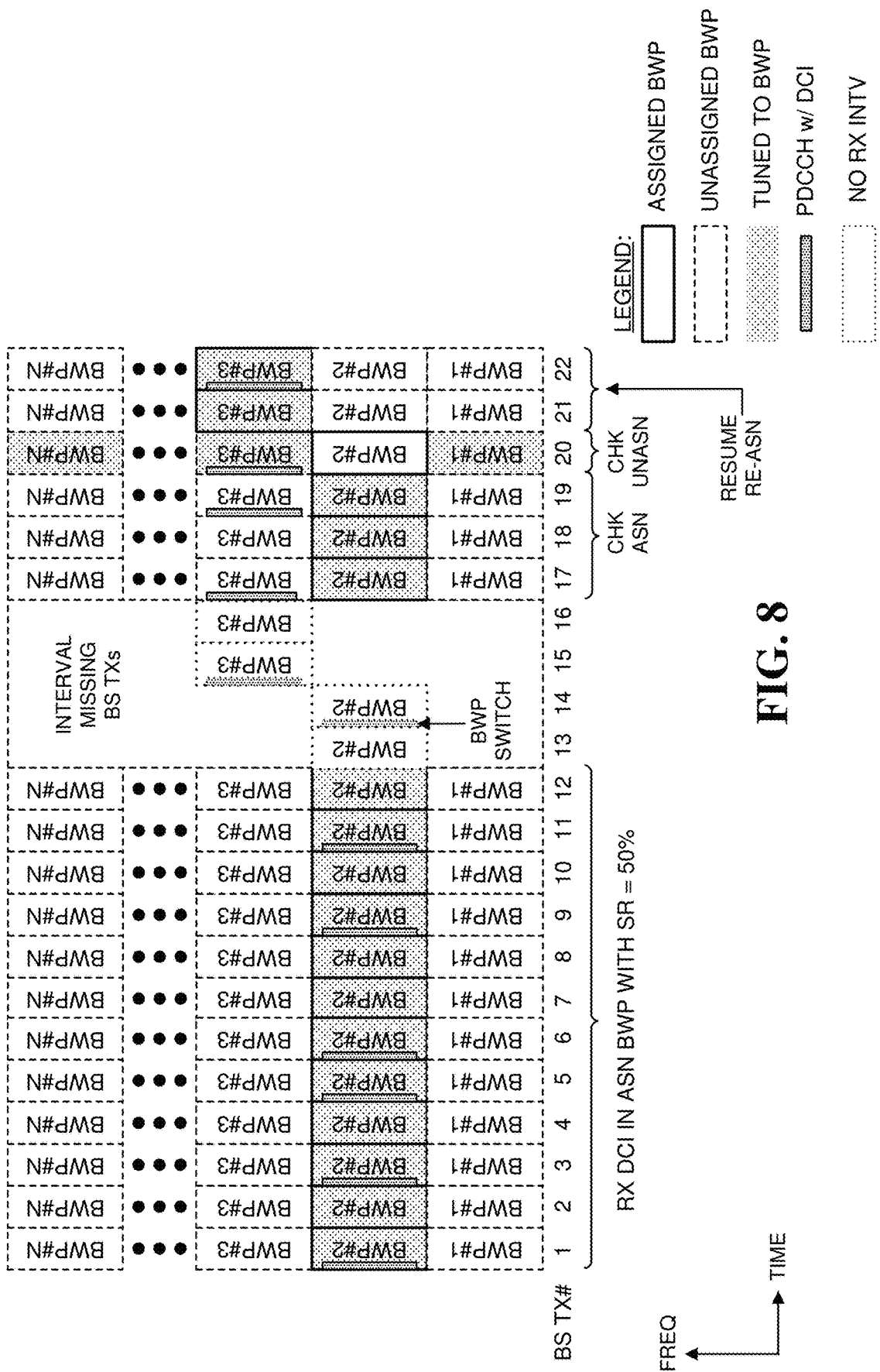

FIG. 8 illustrates a time-frequency graph related to another example method of receiving and processing a set of transmissions from a base station (412 or 462) by a user equipment (UE) (430 or 470) according to some aspects. The time-frequency graph of FIG. 8 is structurally similar to the time-frequency graph of FIG. 5, but depicts a different example. More specifically, in this example, the UE (430 or 470) employs a technique to determine when it should check the one or more unassigned BWPs to determine if there is a DCI (data) addressed to the UE in one of the unassigned BWP. In the example of FIG. 5, the UE (430 or 470) tuned to the unassigned BWPs in base station transmission 20 to determine if there is a DCI (data) addressed to the UE in response to not receiving a DCI (data) in three (3) base station transmissions, e.g., transmissions 17-19.

In the example of FIG. 5, the scheduling rate (SR) for receiving DCIs (data) by the UE is 100 percent—meaning that there was a DCI (data) for the UE in each of the base station transmissions 1-6. The scheduling rate (SR) is the percent ratio of base station transmissions that includes DCIs (data) addressed to the UE to the number of base station transmissions over a time interval of interest. For instance, if the time interval of interest is the interval of base station transmissions 1-12, in this example, the UE (430 or 470) received DCIs in transmissions 1, 3, 5, 6, 9, and 11 as illustrated. Accordingly, the UE (430 or 470) received six (6) DCIs (data) in a time interval of interest of 12 base station transmissions. Thus, in this example, the observed or measured scheduling rate (SR) is 50 percent. It shall be understood that the scheduling rate (SR) for a UE may vary significantly between single-digit percentage up to 100 percent.

After the interval of missing base station transmissions 13-16 in which the base station (412 or 462) transmitted a BWP switch, the UE (430 or 470) checks the assigned BWP#2 for a DCI (data) for three (3) base station transmissions 17-19. In response to determining that there is not DCI (data) addressed to the UE in the assigned BWP#2 of base station transmissions 17-19, the UE (430 or 470) then checks the unassigned BWPs #1, 3-N in base station transmission 20 to determine whether the base station transmitted a DCI (data) in those BWPs. The number of base station transmission that the UE (430 or 470) checks the assigned BWP after an interval of missing base station transmissions before checking the unassigned BWPs may be related to the scheduling rate (SR); and more specifically, inversely related to the measured scheduling rate (SR) or historical data of receiving DCIs (data) from the base station (412 or 462) preceding the interval of missing base station transmissions. This is because if the scheduling rate (SR) is relatively high, then the UE (430 or 470) should expect a DCI within a relatively few base station transmissions. Whereas, if the scheduling rate (SR) is relatively low, then the UE expects a DCI within a larger number of base station transmissions.

As the example illustrates, after checking the unassigned BWPs in base station transmission 20, the UE (430 or 470) determined that there is a DCI (data) addressed to it in BWP#3. The UE (430 or 470) then designates BWP#3 as the assigned or reassigned BWP, and continues to tune to BWP#3 to receive additional DCIs (data) in base station transmissions 21-22.

Figure 9:
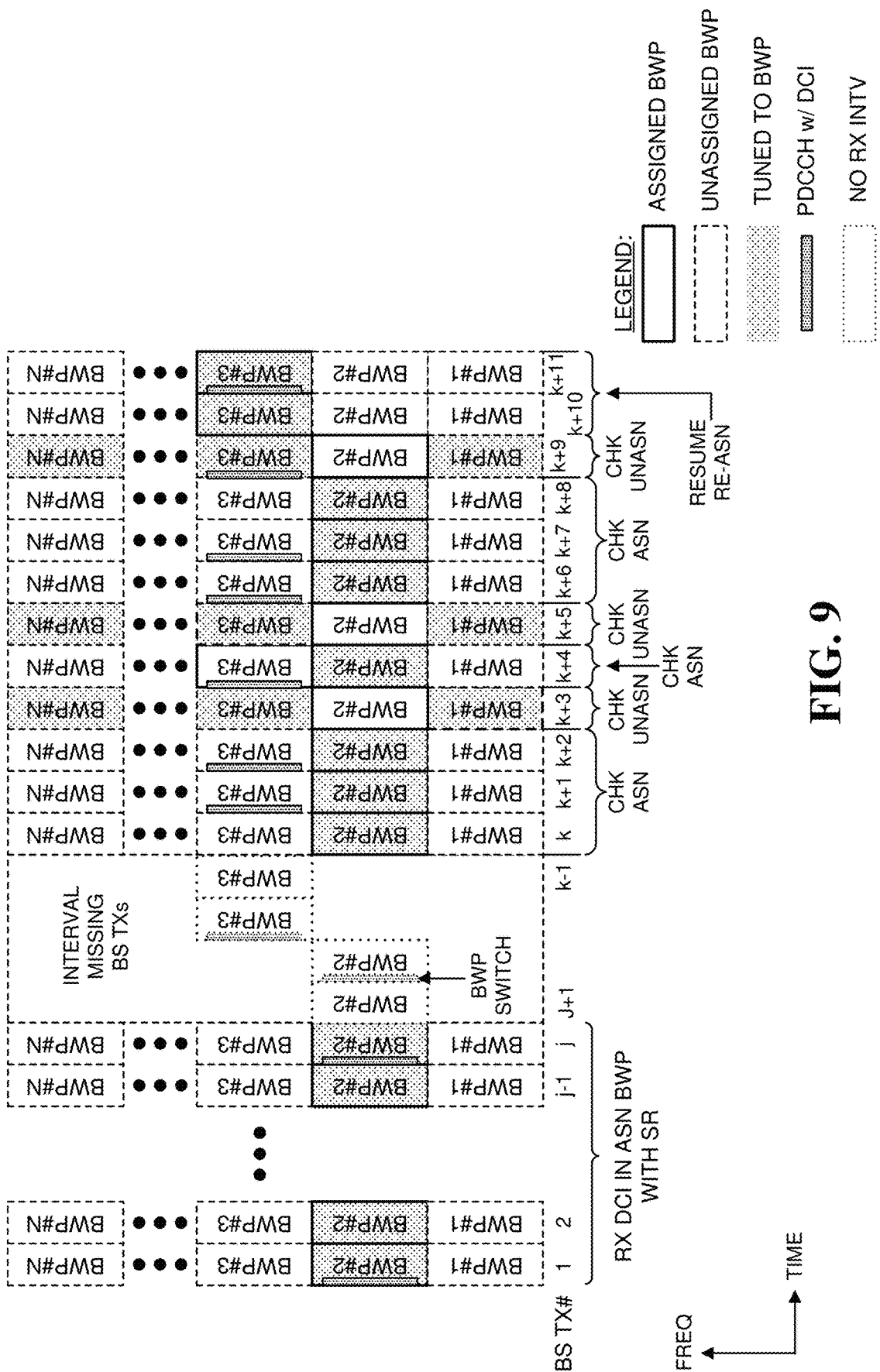

FIG. 9 illustrates a time-frequency graph related to another example of receiving and processing a set of transmissions from a base station (412 or 462) by a user equipment (UE) (430 or 470) according to some aspects. The time-frequency graph of FIG. 9 is structurally similar to the time-frequency graph of FIG. 8, but depicts a different example. More specifically, in this example, the UE (430 or 470) checks the one or more unassigned BWPs for multiple successive base station transmissions in response to not receiving a DCI (data) addressed to the UE within the assigned and unassigned BWPs. Similarly, the number of base station transmissions it checks for DCI (data) in the assigned BWPs before each check of the unassigned BWPs may be related (e.g., inversely) to the observed or scheduling rate (SR) associated with the base station transmissions before the interval of missing base station transmissions.

More specifically, in this example, the UE (430 or 470) receives DCIs (data) within the assigned BWP#2 in a set of base station transmissions 1-j with a particular scheduling rate (SR). Then, the UE (430 or 470) misses a set of base station transmissions j+1 to k−1 due to, as previously discussed, a tuneaway or adverse channel condition. During the missing transmission interval, the UE (430 or 470) misses a BWP switch in transmission j+2 in the assigned BWP#2. When the UE (430 or 470) is able to again receive the base station transmissions, the UE tunes its transceiver to receive base station transmissions k, k+1, and k+2 in the assigned BWP#2, but does not detect any DCI (data) addressed to the UE in such transmissions.

In response to not receiving any DCI (data) in the assigned BWP#2 in base station transmissions k, k+1, and k+2, the UE (430 or 470) then tunes its transceiver to the one or more unassigned BWPs #1, 3 to N to receive base station transmission k+3 to determine whether one of the unassigned BWPs #1, 3 to N includes a DCI (data) addressed to the UE. In response to the UE (430 or 470) determining that none of the unassigned BWPs in transmission k+3 does not include a DCI (data) addressed to the UE, the UE then tunes its transceiver to the assigned BWP#2 to determine whether the next base station transmission k+4 in BWP#2 includes a DCI (data) addressed to the UE. In response to not detecting a DCI (data) in the assigned BWP#2, the UE (430 or 470) then tunes its transceiver to the one or more unassigned BWPs #1, 3 to N to receive base station transmission k+5 to determine whether one of the unassigned #BWPs 1, 3 to N includes a DCI (data) addressed to the UE.

This process of alternating the tuning of the transceiver to the assigned and then to the unassigned BWPs continues until the UE receives a DCI (data) addressed to the UE. In this example, the UE (430 or 470) receives the DCI (data) in base station transmission k+9. The UE (430 or 470) then designates BWP#3 as the assigned or reassigned BWP, and continues to tune to that BWP#3 to receive additional DCIs as illustrated in base station transmission k+10 and k+11. The number of base station transmissions for which the UE (430 or 470) tunes to its assigned BWP#2 could be constant or vary per such interval. If constant, the number of transmissions per each interval may be related to the measured scheduling rate (SR) associated with base station transmission 1 to j−1 (before the interval in which the UE missed the base station transmissions). In this example, the number of base station transmissions during the first interval k to k+2 in the assigned BWP#2 is three (3), the second interval k+4 is one (1), and the third interval k+6 to k+8 is three (3). The mean or average of such intervals may be related to the measured scheduling rate (SR) associated with base station transmission 1 to j−1.

Figure 10:
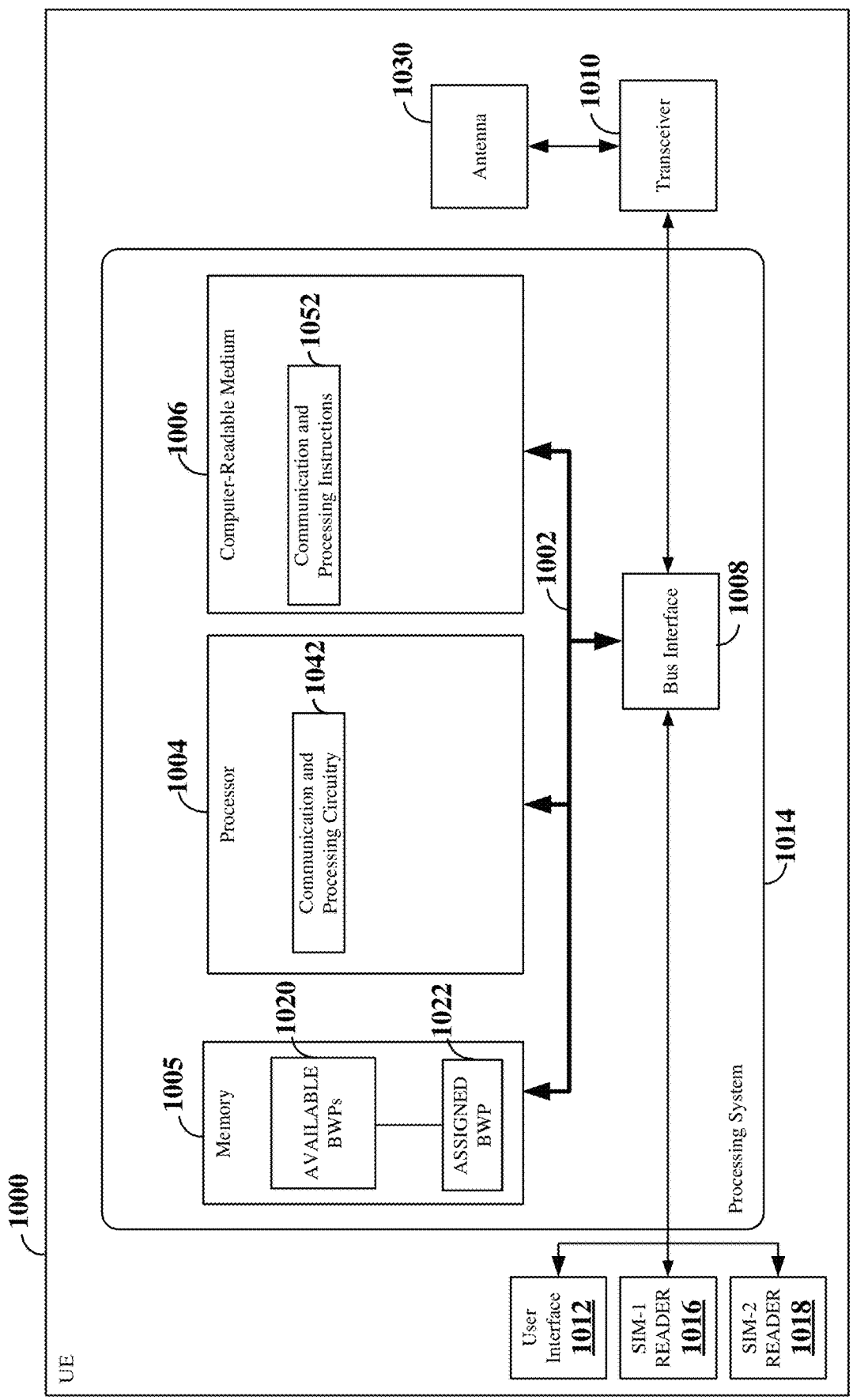
FIG. 10 is a block diagram illustrating an example of a hardware implementation for user equipment (UE) employing a processing system according to some aspects.

FIG. 10 is a block diagram illustrating an example of a hardware implementation for a user equipment (UE) 1000 employing a processing system 1014. For example, the UE 1000 may correspond to any of the UEs or other scheduled entities shown and described above in reference to FIGS. 1, 2, 4A, and/or 4B.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in the UE 1000, may be used to implement any one or more of the processes and procedures described below.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002 and a transceiver 1010 coupled to at least one antenna 1030 (e.g., an antenna array or one or more antenna panels). The transceiver 1010 provides a means for communicating with various other apparatus over a transmission medium (e.g., air interface). Depending upon the nature of the apparatus, a user interface 1012 (e.g., keypad, display, touch screen, speaker, microphone, control knobs, etc.) may also be coupled to the bus interface 1008. Of course, such a user interface 1012 is optional, and may be omitted in some examples. Additionally, the UE 1000 may include one or more SIM card readers, such as SIM-1 reader 1016 and SIM-2 reader 1018, both coupled to the bus interface 1008.

The processor 1004 is responsible for managing the bus 1002 and general processing, including the execution of software stored on the computer-readable medium 1006. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store a set of available BWPs 1020 which the UE 1000 may have received in an RRC message transmitted by a base station. The memory 1005 may further store the assigned BWP 1022 among the set of BWPs 1020.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042, configured to communicate with a base station, such as a gNB. In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1042 may be configured to receive a first set of one or more transmissions (e.g., slot, subframe, or frame) in the assigned bandwidth part (BWP) 1022 of a set of bandwidth parts (BWPs) 1020 from a first base station (BS) via the at least one antenna 1030 and the transceiver 1010, wherein the first set of one or more transmissions includes data (e.g., DCI) addressed to the UE. After missing a reception of a second set of one or more transmissions from the first BS following the first set, the communication and processing circuitry 1042 may be configured to receive a third set of one or more transmissions in the assigned BWP 1022 from the first base station, wherein the third set does not include data addressed to the UE 1000. The communication and processing circuitry 1042 may be configured to determine whether a fourth set of one or more transmissions received from the first BS in one or more unassigned BWPs of the set of BWPs 1020 via the at least one antenna 1030 and the transceiver 1010 includes data addressed to the UE 1000 in response to the third set not including data addressed to the UE 1000.

The communication and processing circuitry 1042 may further be configured to identify one of the unassigned BWP from the fourth set of one or more transmissions that includes data (e.g., a DCI addressed to the UE 1000, and designate the identified unassigned BWP as a reassigned BWP. The communication and processing circuitry 1042 may further be configured to receive a fifth set of one or more transmissions in the reassigned BWP from the first BS, wherein the fifth set of one or more transmissions includes data addressed to the UE. The communication and processing circuitry 1042 may be configured to receive a fifth set of one or more transmissions from a second base station (BS) during the missing of the reception of the second set of one or more transmissions. The communication and processing circuitry 1042 may be configured to receive the first set of one or more transmissions based on information in the first subscriber identification module (SIM) in the SIM-1 reader 1016, and receive the fifth set of one or more transmissions based on information in a second SIM in the SIM-2 reader 1018. The communication and processing circuitry 1042 may have missed the reception of the second set of one or more transmissions from the first BS due to adverse channel conditions between the UE and the first BS.

The communication and processing circuitry 1042 may further be configured to measure a scheduling rate (SR) related to a number of transmissions in the first set that includes data (e.g., DCI) addressed to the UE 1000 over a total number of transmissions in the first set. As discussed, the measured scheduling rate is related to a number of transmissions in the first set that includes data addressed to the UE over a total number of transmissions in the first set. The communication and processing circuitry 1042 may further be configured to determine whether a fifth set of one or more transmissions from the first BS in the assigned BWP includes data addressed to the UE in response to determining that the fourth set of one or more transmissions does not include data addressed to the UE. The communication and processing circuitry 1042 may further be configured to determine whether a sixth set of one or more transmissions from the first BS in the one or more unassigned BWPs includes data addressed to the UE in response to determining that the fifth set of one or more transmissions does not include data addressed to the UE. The numbers of transmissions in the fifth and sixth sets may be related to a measured scheduling rate associated with the first set of one or more transmissions.

Figure 11:
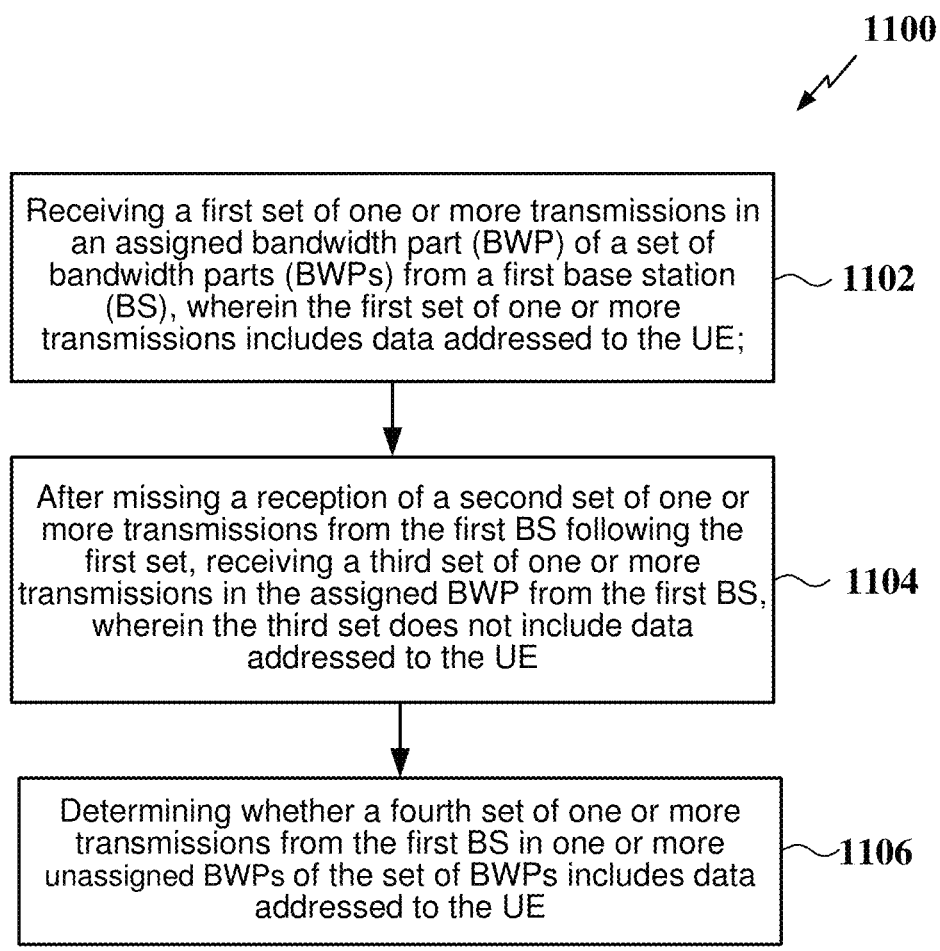
FIG. 11 is a flow chart illustrating an exemplary method of wireless communication at a user equipment (UE) according to some aspects.

FIG. 11 is a flow chart illustrating an exemplary method 1100 of wireless communication at a user equipment (UE) 1000 according to some aspects. The method 1100 includes the processor 1004 receiving a first set of one or more transmissions in an assigned bandwidth part (BWP) of a set of bandwidth parts (BWPs) from a first base station (BS) via the transceiver 1010, wherein the first set of one or more transmissions includes data addressed to the UE 1000 (block 1102). Further, according to the method 1100, after missing a reception of a second set of one or more transmissions from the first BS following the first set, the processor 1004 receives a third set of one or more transmissions in the assigned BWP from the first BS via the transceiver 1010, wherein the third set does not include data addressed to the UE 1000 (block 1104). Additionally, the method 1100 includes the processor 1004 determining whether a fourth set of one or more transmissions from the first BS in one or more unassigned BWPs of the set of BWPs includes data addressed to the UE 1000 in response to the third set not including data addressed to the UE (block 1106).

In one configuration, the UE 1000 includes various means as described in the present disclosure. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable medium 1006, or any other suitable apparatus or means described in any one of the FIGS. 1, 2, and 4A-4B, and utilizing, for example, the processes and/or algorithms described herein in relation to FIG. 10.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4A-4B, and 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method of wireless communication at a user equipment (UE), comprising:
receiving a first set of one or more transmissions in an assigned bandwidth part (BWP) of a set of bandwidth parts (BWPs) from a first base station (BS), wherein the first set of one or more transmissions includes data addressed to the UE;
after missing a reception of a second set of one or more transmissions from the first BS following the first set, receiving a third set of one or more transmissions in the assigned BWP from the first BS, wherein the third set does not include data addressed to the UE;
determining whether a fourth set of one or more transmissions from the first BS in one or more unassigned BWPs of the set of BWPs includes data addressed to the UE in response to the third set not including data addressed to the UE; and
determining whether a fifth set of one or more transmissions from the first BS in the assigned BWP includes data addressed to the UE in response to determining that the fourth set of one or more transmissions does not include data addressed to the UE.

2. The method of claim 1, further comprising:
identifying one of the one or more unassigned BWPs from the fourth set of one or more transmissions that includes data addressed to the UE; and
designating the identified unassigned BWP as a reassigned BWP.

3. The method of claim 2, further comprising receiving the fifth set of one or more transmissions in the reassigned BWP from the first BS, wherein the fifth set of one or more transmissions includes data addressed to the UE.

4. The method of claim 1, further comprising receiving the fifth set of one or more transmissions from a second BS during the missing of the reception of the second set of one or more transmissions.

5. The method of claim 4, wherein receiving the first set of one or more transmissions is based on information in a first subscriber identification module (SIM) card, and wherein receiving the fifth set of one or more transmissions is based on information in a second SIM card.

6. The method of claim 1, wherein missing the reception of the second set of one or more transmissions from the first BS is due to adverse channel conditions between the UE and the first BS.

7. The method of claim 1, wherein a number of one or more transmissions in the third set is related to a measured scheduling rate associated with the first set of one or more transmissions.

8. The method of claim 7, wherein the measured scheduling rate is related to a number of transmissions in the first set that includes data addressed to the UE over a total number of transmissions in the first set.

9. The method of claim 1, further determining whether a sixth set of one or more transmissions from the first BS in the one or more unassigned BWPs includes data addressed to the UE in response to determining that the fifth set of one or more transmissions does not include data addressed to the UE.

10. The method of claim 9, wherein a number of transmissions in the fifth and sixth sets are related to a measured scheduling rate associated with the first set of one or more transmissions.

11. The method of claim 1, wherein the data in the first set of one or more transmissions comprises downlink control information (DCI).

12. The method of claim 1, wherein each transmission in the first set comprises a slot, a subframe, or a frame.

13. A user equipment (UE) within a wireless communication network, comprising:
a transceiver;
a memory; and a processor coupled to the transceiver and the memory, wherein the processor and the memory are configured to:
  receive a first set of one or more transmissions in an assigned bandwidth part (BWP) of a set of bandwidth parts (BWPs) from a first base station (BS) via the transceiver, wherein the first set of one or more transmissions includes data addressed to the UE;
  after missing a reception of a second set of one or more transmissions from the first BS following the first set, receive a third set of one or more transmissions in the assigned BWP from the first BS via the transceiver, wherein the third set of one or more transmissions does not include data addressed to the UE;
  determine whether a fourth set of one or more transmissions from the first BS in one or more unassigned BWPs of the set of BWPs includes data addressed to the UE in response to the third set not including data addressed to the UE; and
  determine whether a fifth set of one or more transmissions from the first BS in the assigned BWP includes data addressed to the UE in response to determining that the fourth set of one or more transmissions does not include data addressed to the UE.

14. The UE of claim 13, wherein the processor and the memory are further configured to:
  identify one of the one or more unassigned BWPs from the fourth set of one or more transmissions that includes data addressed to the UE; and
  designate the identified unassigned BWP as a reassigned BWP.

15. The UE of claim 14, wherein the processor and the memory are further configured to receive the fifth set of one or more transmissions in the reassigned BWP from the first BS via the transceiver, wherein the fifth set of one or more transmissions includes data addressed to the UE.

16. The UE of claim 13, wherein the processor and the memory are further configured to receive the fifth set of one or more transmissions from a second BS during the missing of the second set of one or more transmissions.

17. The UE of claim 16, wherein the processor and the memory are further configured to receive the first set of one or more transmissions based on information in a first subscriber identification module (SIM) card, and receive the fifth set of one or more transmissions based on information in a second SIM card.

18. The UE of claim 13, wherein the missing of the second set of one or more transmissions from the first BS is due to adverse channel conditions between the UE and the first BS.

19. The UE of claim 13, wherein a number of the one or more transmissions in the third set is related to a measured scheduling rate associated with the first set of one or more transmissions.

20. The UE of claim 19, wherein the measured scheduling rate is related to a number of transmissions in the first set that includes the data addressed to the UE over a total number of transmissions in the first set.

21. The UE of claim 13, wherein the processor and the memory are further configured to determine whether a sixth set of one or more transmissions from the first BS in the one or more unassigned BWPs includes data addressed to the UE in response to determining that the fifth set of one or more transmissions does not include data addressed to the UE.

22. The UE of claim 21, wherein a number of transmissions in the fifth and sixth sets are related to a measured scheduling rate associated with the first set of one or more transmissions.

23. A user equipment (UE) within a wireless communication network, comprising:
  means for receiving a first set of one or more transmissions in an assigned bandwidth part (BWP) of a set of bandwidth parts (BWPs) from a first base station (BS), wherein the first set of one or more transmissions includes data addressed to the UE;
  means for receiving a third set of one or more transmissions in the assigned BWP from the first BS after missing a reception of a second set of one or more transmissions from the first BS following the first set, wherein the third set of one or more transmissions does not include data addressed to the UE;
  means for determining whether a fourth set of one or more transmissions from the first BS in one or more unassigned BWPs of the set of BWPs includes data addressed to the UE in response to the third set not including data addressed to the UE; and
  means for determining whether a fifth set of one or more transmissions from the first BS in the assigned BWP includes data addressed to the UE in response to determining that the fourth set of one or more transmissions does not include data addressed to the UE.

24. The UE of claim 23, further comprising:
  means for identifying one of the one or more unassigned BWPs from the fourth set of one or more transmissions that includes data addressed to the UE; and
  means for designating the identified unassigned BWP as a reassigned BWP.

25. The UE of claim 24, further comprising means for receiving the fifth set of one or more transmissions in the reassigned BWP from the first BS, wherein the fifth set of one or more transmissions includes data addressed to the UE.

26. The UE of claim 23, further comprising means for receiving the fifth set of one or more transmissions from a second BS during the missing of the reception of the second set of one or more transmissions.

27. The UE of claim 26, wherein the means for receiving the first set of one or more transmissions is responsive to information in a first subscriber identification module (SIM) card, and wherein the means for receiving the fifth set of one or more transmissions is responsive to information in a second SIM card.

28. A non-transitory computer-readable medium storing computer-executable code, comprising code for causing a computer in a user equipment (UE) to:
  receive a first set of one or more transmissions in an assigned bandwidth part (BWP) of a set of bandwidth parts (BWPs) from a first base station (BS) via a transceiver, wherein the first set of one or more transmissions includes data addressed to the UE;
  after missing a reception of a second set of one or more transmissions from the first BS following the first set, receive a third set of one or more transmissions in the assigned BWP from the first BS via the transceiver, wherein the third set of one or more transmissions does not include data addressed to the UE;
  determine whether a fourth set of one or more transmissions from the first BS in one or more unassigned BWPs of the set of BWPs includes data addressed to the UE in response to the third set not including data addressed to the UE; and determine whether a fifth set of one or more transmissions from the first BS in the assigned BWP includes data addressed to the UE in response to determining that the fourth set of one or more transmissions does not include data addressed to the UE.

\* \* \* \* \*